(12) United States Patent
Matsumoto et al.

(10) Patent No.: US 6,444,142 B1
(45) Date of Patent: Sep. 3, 2002

(54) METHOD OF PREPARING BARIUM FLUOROIODIDE, IODINE-CONTAINING BARIUM FLUOROHALIDE PHOSPHOR, AND RADIATION IMAGE CONVERSION PANEL

(75) Inventors: Hiroshi Matsumoto; Chiyuki Umemoto; Kazuhiro Hasegawa, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/652,130

(22) Filed: Aug. 31, 2000

(30) Foreign Application Priority Data

Sep. 14, 1999 (JP) .......................................... 11-259972

(51) Int. Cl.$^7$ ................................................ C09K 4/00
(52) U.S. Cl. ................................ 252/301.4 H; 423/466
(58) Field of Search ................... 252/301.4 R; 423/466

(56) References Cited

U.S. PATENT DOCUMENTS 4,239,968 A  12/1980  Kotera et al. ............ 250/327.1

5,464,568 A  * 11/1995  Bringley et al. ..... 252/301.4 H

* cited by examiner

*Primary Examiner*—C. Melissa Koslow
(74) *Attorney, Agent, or Firm*—Birch Stewart Kolasch & Birch LLP

(57) ABSTRACT

A method of preparing barium fluoroiodide, an iodine-containing barium fluorohalide in which the barium fluoroiodide is used for at least one of materials thereof, and a radiation image conversion panel are provided. In the method of preparing barium fluoroiodide in a suspension preparing step, barium carbonate is added to and mixed with an aqueous solution of hydrogen iodide, such that a molar ratio of the hydrogen iodide to the barium carbonate is 0.5 to 2. A resultant solution is concentrated such that a concentration of barium iodide dissolved in the solution is at least 3.0 mol/l. Then, hydrogen fluoride is added and reacted to generate a precipitate, a rate of addition of the hydrogen fluoride being adjusted such that a molar ratio of the hydrogen fluoride to the barium carbonate added in the suspension preparing step is 0.4 to 0.8 and a theoretical amount of a precipitate of barium fluoroiodide produced during the addition of the hydrogen fluoride is 0.001 to 10 N/min wherein N is an amount of the precipitate of barium fluoroiodide which will finally be obtained. Then, the precipitate is separated.

22 Claims, 2 Drawing Sheets

METHOD OF PREPARING BARIUM FLUOROIODIDE, IODINE-CONTAINING BARIUM FLUOROHALIDE PHOSPHOR, AND RADIATION IMAGE CONVERSION PANEL

BACKGROUND OF THE INVENTION

1. Field of the Invention

The present invention relates to a method of preparing barium fluoroiodide, and specifically to a method of preparing barium fluoroiodide as a phosphor materials.

2. Description of the Related Art

Conventionally, a bivalent europium-activated barium fluorohalide phosphor (BaFX:Eu$^{2+}$; wherein X is Cl, Br and/or I) has been known as a phosphor for a radiation image conversion panel used for radiography projection. This phosphor emits light (instantaneous emission of light) in a near-infrared region, which emission has an emission maximum close to 390 nm, when excited with radiation such as an X-ray, electron beam, ultraviolet ray, or the like.

Further, it has been found that, if the above-described phosphor is exposed to the above-mentioned radiation, and then excited with electromagnetic waves (excitation light) in a range from a visible region to an infrared region, the phosphor emits light in a near-ultraviolet region; i.e., stimulated emission. As disclosed in Japanese Patent Application Laid-Open (JP-A) No. 55-12145 and the like, the phosphor has been especially noted as a phosphor for a radiation image conversion panel used in a radiation image conversion method which utilizes stimulability of the phosphor. Of such phosphors, bivalent europium-activated barium fluoroiodide phosphor (BaFI:Eu$^{2+}$) emits longer wavelenth light whose wavelength is in the longer wavelength side. Accordingly, it has been proposed that this phosphor be used in combination with semiconductor laser light which serves as excitation light and whose oscillation wavelength is in a near-ultraviolet region.

Barium fluoroiodide (BaFI) is used as a material (a so-called phosphor powder) for manufacturing the aforementioned bivalent europium-activated barium fluoroiodide phosphor or a bivalent europium-activated iodine-containing barium halide phosphor.

Japanese Patent Application No. 60-243613, filed by the applicant of the present invention, discloses a method to obtain a barium fluorohalide. In this method, at least one compound, which is selected from the group consisting of carbonate, nitrate and sulfate which are salts of barium is reacted with at least one compound selected from the group consisting of hydrogen chloride, hydrogen bromide and hydrogen fluoride to generate a barium halide. Then the resultant product is reacted with hydrogen fluoride to generate the barium fluorohalide. However, barium fluoroiodide, unlike barium fluorobromide and the like, has a high solubility with respect to water. Therefore, the product cannot be obtained with a sufficiently high yield simply by reacting the materials in an aqueous medium. Further, there is a problem in that it is easy for impurities to be mixed in.

SUMMARY OF THE INVENTION

An object of the present invention is to provide a method of preparing barium fluoroiodide in which barium fluoroiodide having high purity can be obtained with high yield. Another object of the present invention is to provide an iodine-containing barium fluorohalide phosphor in which the barium fluoroiodide obtained by the above-mentioned method is used as at least one of materials for the phosphor, and a radiation image conversion panel in which the iodine-containing barium fluorohalide phosphor is used.

The above-described objects are accomplished by the present invention. That is to say, a first aspect of the present invention is a method of preparing barium fluoroiodide comprising the steps of: (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l; (b) precipitating barium fluoroiodide by adding a total amount of hydrogen fluoride to the suspension to achieve a molar ratio from 0.4 to 0.8 of hydrogen iodide to the barium carbonate, and wherein the hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and (c) separating the precipitate.

In the claim 1, (a) may be referred to as a suspension preparing step, (b) may be referred to as a precipitate generating step, and (c) may be referred to as a precipitate separating step.

A second aspect of the present invention is an iodine-containing barium fluorohalide phosphor, which is prepared by using, as at least one of materials for preparation therefor, barium fluoroiodide obtained by the method of preparing barium fluoroiodide comprising the steps of: (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l; (b) precipitating barium fluoroiodide by adding a total amount of hydrogen fluoride to the suspension to achieve a molar ratio from 0.4 to 0.8 of hydrogen iodide to the barium carbonate, and wherein the hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and (c) separating the precipitate.

A third aspect of the present invention is a radiation image conversion panel which is formed such that a phosphor layer contains at least the iodine-containing barium fluorohalide phosphor prepared by using, at least one of materials for preparation therefor, barium fluoroiodide obtained by the method of preparing barium fluoroiodide comprising the steps of: (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l; (b) precipitating barium fluoroiodide by adding a total amount of hydrogen fluoride to the suspension to achieve a molar ratio from 0.4 to 0.8 of hydrogen iodide to the barium carbonate, and wherein the hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and (c) separating the precipitate.

DESCRIPTION OF THE PREFERRED EMBODIMENTS

Figure 1:
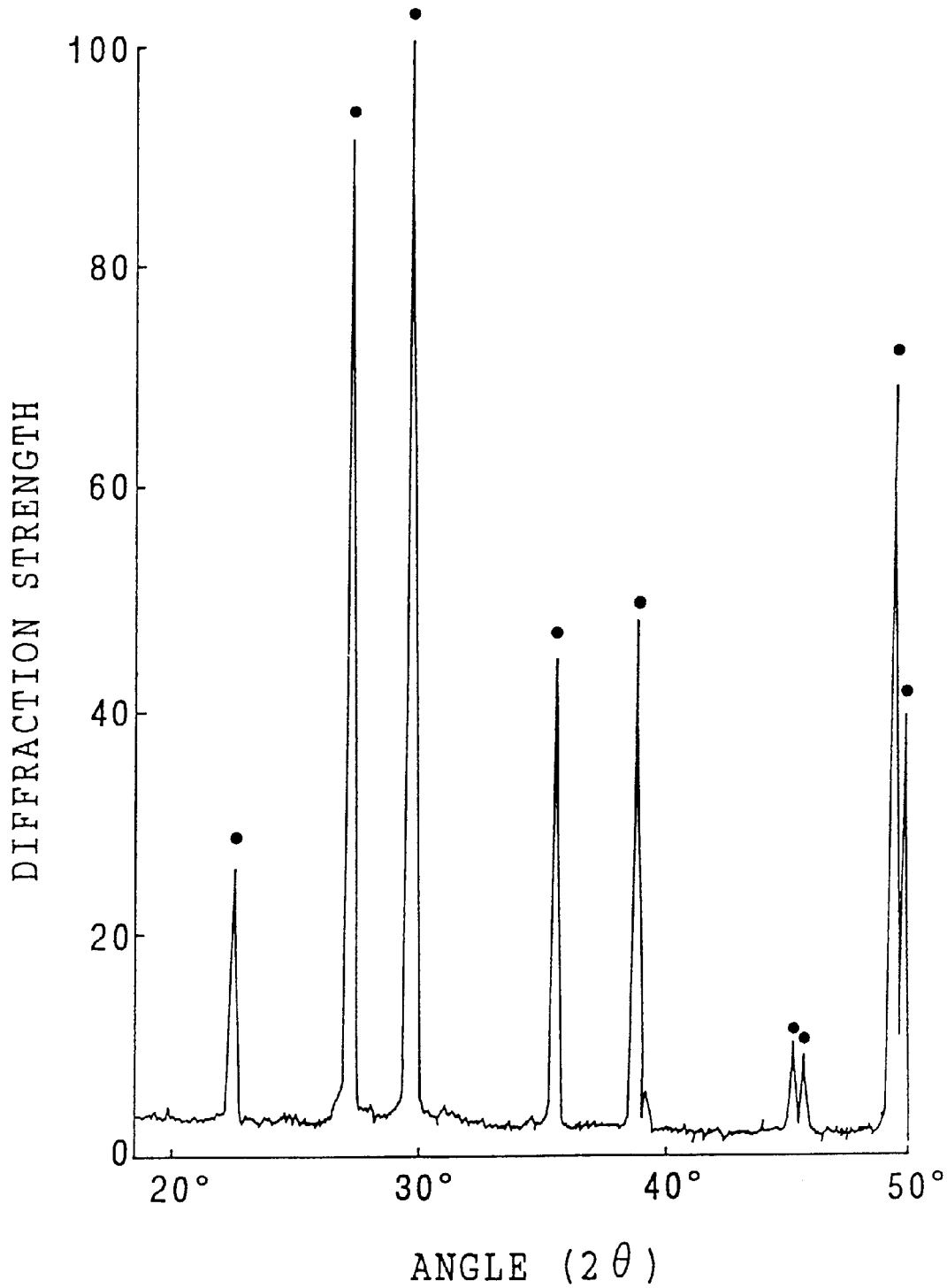
FIG. 1 is a graph showing X-ray diffraction spectra of products obtained in Examples 1 and 2.

The present invention will be described in detail below with reference to embodiments.

A: Method of Preparing Barium Fluoroiodide

A method of preparing barium fluoroiodide of the present invention includes a suspension preparing step, a precipitate generating step and a precipitate separating step. The method further includes, if necessary, a ripening step and/or a precipitation accelerating step between the precipitate generating step and the precipitate separating step.

Reactions in the method of preparing barium fluoroiodide of the present invention are shown by the following reaction formulae.

$$BaCO_3 + 2HI \rightarrow BaI_2 + H_2O + CO_2\uparrow \quad (1)$$

$$BaI_2 + HF \rightarrow BaFI + HI \quad (2)$$

Reaction formula (1) represents a reaction in the suspension preparing step and reaction formula (2) represents a reaction in the precipitate generating step.

The respective steps will be described below.

Suspension Preparing Step

In the suspension preparing step, firstly, barium carbonate is added to and mixed with an aqueous solution of hydrogen iodide. A molar ratio of the hydrogen iodide to the barium carbonate is within a range of 0.5 to 2. The reaction represented by reaction formula (1) is caused to proceed by this adding and mixing.

At this time, an added amount of barium carbonate ($BaCO_3$) is the same as or more than an amount thereof which is necessary for the reaction represented by reaction formula (1). As a result, some of the $BaCO_3$ remains unreacted. In the precipitate generating step described later, this unreacted $BaCO_3$ is allowed to react, in accordance with the reaction represented by reaction formula (1), with hydrogen iodide (HI) produced by the reaction represented by reaction formula (2). Thus, overall reaction efficiency is very high.

The added amount of barium carbonate must be such that the molar ratio of hydrogen iodide to barium carbonate is in the range of 0.5 to 2. The range is preferably 0.8 to 1.5. If the molar ratio exceeds 2, HI in a reaction solution will increase and the reaction represented by reaction formula (2) will not proceed with ease, which is not preferable. If the molar ratio is less than 0.5, an amount of unreacted $BaCO_3$ will be too large and reaction efficiency may be lowered, which is also not preferable.

The concentration of hydrogen iodide in the aqueous solution is preferably about 30 to 70% by weight. Methods of adding and mixing are not especially limited. The barium carbonate may be added gradually, intermittently, or all at one time. The mixing may be carried out by known stirring means.

The solution obtained by mixing barium carbonate with the aqueous solution of hydrogen iodide contains barium iodide produced by the reaction represented by reaction formula (1). At this time, the concentration of barium iodide is about 1 to 3 mol/l. This concentration is low for the reaction represented by reaction formula (2) in the next step, the precipitate generating step, which will lead to a lowering of reaction efficiency. Accordingly, it is necessary to concentrate the solution such that the concentration of barium iodide dissolved in the solution is at least 3.0 mol/l and preferably 4 to 6 mol/l.

In this way, barium iodide ($BaI_2$) exists in a reaction system at a high concentration and therefore, barium fluoroiodide can be produced at high yield and high purity in the next step, the precipitate generating step. That is to say, by adjusting a solubility product of $BaI_2$ and $BaF_2$ in the reaction system so as to be larger than a solubility of BaFI, BaFI can be efficiently precipitated and produced. Further, by preventing $BaF_2$ (an impurity) from being precipitated, high purity BaFI can be obtained.

Concentration of the solution can be carried out by heating the solution under ordinary pressure or under a reduced pressure caused by an exhaust pump or an aspirator. Although a lower limit of the heating temperature is not especially limited, the lower limit is preferably at least 50° C. and more preferably at least 80° C., in view of concentration efficiency. On the other hand, although an upper limit of the heating temperature is not especially limited either, the upper limit is more preferably less than 120° C.

A suspension obtained after concentration in the above-described manner generally has a pH range of 1.5 to 6.0.

If a finally obtained barium fluoroiodide is to be used as a phosphor matarial, it is desirable that the barium fluoroiodide is uniformly mixed with europium or cerium which serves as an activator. Therefore, in the suspension preparing step, an amount of europium halide or cerium halide is added such that a molar ratio with respect to a finally obtained amount of barium fluoroiodide is 0.00001 to 0.01, and more preferably 0.0001 to 0.005. In the suspension preparing step, the europium halide or cerium halide may be added before or after concentration of the solution, or during a concentration step.

By adding europium halide or cerium halide as described above, in the subsequent precipitate generating step, europium or cerium coprecipitates with the barium fluoroiodide, and the barium fluoroiodide can be finally obtained uniformly mixed with the europium or cerium.

Precipitate Generating step

Hydrogen fluoride is added to the suspension obtained in the above-described suspension preparing step. A rate of addition of hydrogen fluoride is adjusted such that a molar ratio of the hydrogen fluoride to the barium carbonate that was added in the suspension preparing step is in a range of 0.4 to 0.8, and a theoretical amount of the precipitate of barium fluoroiodide produced during the addition of the hydrogen fluoride is in a range of 0.001 N/min to 10 N/min (wherein N represents a theoretical amount of a precipitate of barium fluoroiodide which will finally be obtained). By this addition of hydrogen fluoride, the reaction represented by reaction formula (2) is caused to proceed. A precipitate of barium fluoroiodide is generated by progress of the reaction.

In the present invention, the "theoretical amount of precipitate of barium fluoroiodide produced during the addition of the hydrogen fluoride" does not mean an amount of the precipitate which is actually obtained at any particular time during adding of the hydrogen fluoride (i.e., produced at any given moment), but means an amount of the precipitate in a hypothetical case in which all hydrogen fluoride reacts at the time of being added and generates the precipitate of barium fluoroiodide.

An added amount of hydrogen fluoride must be such that a molar ratio with respect to the barium carbonate added in the suspension preparing step is in a range of 0.4 to 0.8. If the molar ratio is less than 0.4, an amount of barium fluoroiodide produced will be small and productivity will be inferior. On the other hand, if the molar ratio exceeds 0.8, barium fluoride is easily generated as an impurity.

It is necessary to adjust the rate of addition of the hydrogen fluoride such that, if the amount of the precipitate of barium fluoroiodide which will finally be obtained is N, the theoretical amount of the precipitate of barium fluoroiodide produced during the addition of the hydrogen fluoride is 0.001 N/min to 10 N/min. The rate of addition of the hydrogen fluoride is preferably adjusted such that the theoretical amount is 0.002 N/min to 0.5 N/min. If the hydrogen fluoride is added at a rate such that the theoretical amount exceeds 10 N/min, the reaction proceeds rapidly such that shape and size of particles of obtained barium fluoroiodide are not stable. If hydrogen fluoride is added at a rate such that the theoretical amount is less than 0.001 N/min, the process takes too much time and is inefficient.

The reaction temperature in the precipitate generating step is preferably 20 to 80° C., more preferably 40 to 80° C. and most preferably 50 to 80° C. If the reaction temperature is less than 20° C., the reaction is slow, which is not preferable. On the other hand, if the reaction temperature exceeds 80° C., the solubility of BFI is increased, which is not preferable.

Scale of reactions in the suspension preparing step and the precipitate generating step is assumed to be from so-called beaker size (about 200 ml) to about 2000. The present invention can be applied at any scale in this range.

Ripening Step

As described above, by carrying out the suspension preparing step and the precipitate generating step, a precipitate of barium fluoroiodide can be generated. In order to appropriately control particle size of the barium fluoroiodide and enhance uniformity thereof, it is preferable to ripen the precipitate, after the precipitate generating step, at a temperature of 20 to 80° C. for 10 minutes to 36 hours.

The ripening temperature is preferably 20 to 80° C., more preferably 40 to 80° C., and most preferably 50 to 80° C. A ripening temperature of less than 20° C. is not preferable because ripening is slow. On the other hand, a ripening temperature exceeding 80° C. is not preferable because the solubility of BFI is increased.

The ripening time is preferably 10 minutes to 36 hours and more preferably 30 minutes to 15 hours. A ripening time shorter than 10 minutes is not preferable because effects of ripening cannot be sufficiently obtained. On the other hand, if the ripening time is longer than 36 hours, the particle size of the barium fluoroiodide does not change further, and there may be a possibility that the obtained barium fluoroiodide will decompose again, which would be wasteful.

Precipitation Accelerating Step

After the precipitate generating step (if the ripening step is carried out, after the ripening step), it is preferable to provide a precipitation accelerating step in which a solvent is added to precipitate the barium fluoroiodide wherein solubility of barium fluoroiodide in the solvent is lower than solubility of barium fluoroiodide in water. By providing the precipitation accelerating step, precipitation of barium fluoroiodide can be accelerated.

Examples of the solvent in which the solubility of barium fluoroiodide is lower than the solubility of barium fluoroiodide in water include alcohols having at least 3 carbon atoms. Among them, 2-propanol (IPA) is preferable because barium fluoroiodide has low solubility therein and 2-propanol is inexpensive.

An added amount of the solvent in which the solubility of barium fluoroiodide is lower than the solubility of barium fluoroiodide in water depends on the solubility of the solvent with respect to barium fluoroiodide. However, if, for example, 2-propanol is used, the added amount is preferably 0.1 to 2 l per liter of reaction solution (suspension).

Precipitate Separating Step

After the suspension preparing step, the precipitate generating step, and if required, the ripening step and/or the precipitation accelerating step are carried out as described above, barium fluoroiodide can be obtained by separating the precipitate of barium fluoroiodide that is in a reaction solution.

Separation is carried out by filtrating the barium fluoroiodide by separating means such as, for example, suction filtration, pressure filtration, centrifugation or the like. The separated barium fluoroiodide is generally washed and dried to be an end product.

Washing is carried out using a solvent such as an alcohol having at least 3 carbon atoms, such as 2-propanol or the like. Drying may be air drying, may be forced drying with hot air or an oven, or may be reduced pressure drying.

A solution (reaction solution) from which precipitated barium fluoroiodide has been separated can be concentrated for use in the next preparation of barium fluoroiodide. Thus, the solution can be repeatedly used (recycled) as a reaction mother liquor. Here, concentration can be carried out in the same manner as the concentration described in the suspension preparing step.

When the solution is recycled in this way, decreasing a concentration of $F^-$ in the solution is preferable from a standpoint of not affecting a new barium fluoroiodide generating process. To decrease the concentration of $F^-$, it is effective to provide the precipitation accelerating step. If a solution wherein the concentration of $F^-$ is high is used in the next preparation of barium fluoroiodide, in the suspension preparing step, the $F^-$ reacts with the added europium halide or cerium halide and precipitates early as $EuF_3$ or $CeF_3$. Therefore, especially when the object is to obtain a Phosphor material, it is not preferable. Accordingly, providing the precipitation accelerating step is effective.

Average Particle Diameter of Barium Fluoroiodide

Barium fluoroiodide prepared in the above-described manner desirably has an average particle diameter of 1 to 2 μm in view of suitability as a phosphor material. Here, the average particle diameter is a volume reference value measured by a laser diffraction type particle size discrimination analyzer (LA-500, manufactured by Horiba Ltd.).

The average particle diameter of barium fluoroiodide is more preferably 1 to 10 μm and most preferably 1 to 6 μm.

B: Iodine-Containing Barium Fluorohalide Phosphor

The barium fluoroiodide obtained in the above-described manner is mainly used as a material for a barium fluoroiodide phosphor or an iodine-containing barium fluorohalide phosphor. A description is given below of a method for preparing an iodine-containing barium fluorohalide phosphor.

The iodine-containing barium fluorohalide phosphor is prepared by a preparing method in which steps as Phosphor Material, Material Mixing Step, Calcinating Step, Cooling Step, and, if necessary, Other Steps are carried out as described below. However, the present invention is not limited to this method.

Phosphor Material

Apart from the barium fluoroiodide prepared by the above-described preparing method of the present invention, other phosphor materials are not especially limited and materials obtained by any well known method may be used.

The phosphor material includes materials (1) to (5), as follows:

(1) BaFI produced by the producing method of the present invention, and, as necessary, at least one barium halide selected from the group consisting of $BaF_2$, $BaCl_2$, $BaBr_2$, BaFBr and BaFCl;

(2) at least one alkaline earth metal halide selected from the group consisting of $CaF_2$, $CaCl_2$, $CaBr_2$, $CaI_2$, $SrF_2$, $SrCl_2$, $SrBr_2$, $SrI_2$, $MgF_2$, $MgCl_2$, $MgBr_2$ and $MgI_2$;

(3) at least one alkaline metal halide selected from the group consisting of CsCl, CsBr, CsI, NaCl, NaBr, NaI, KCl, KBr, KI, RbCl, RbBr, RbI, RbF, CsF, NaF, KF, LiF, LiCl, LiBr and LiI;

(4) at least one metal oxide selected from the group consisting of $Al_2O_3$, $SiO_2$, and $ZrO_2$; and (5) at least one compound selected from the group consisting of rare earth element compounds such as halides, oxides, nitrates, sulfates and the like of Ce, Pr, Sm, Eu, Gd, Tb, Dy, Pm, Ho, Nd, Er, Tm and Yb.

If europium or cerium has already been uniformly mixed with BaFI produced by the producing method of the present invention, materials included in (5) are not necessary or only a small amount of the materials is necessary. If desired, ammonium halide (NH4X'; wherein X' is F, Cl, Br or I) or the like may be used as a flux.

Material Mixing Step

A mixture of phosphor materials is prepared by selecting desired materials from each of the materials (1) to (5), stoichiometrically measuring out desired composition ratio by weight and mixing the materials.

A method of preparing the mixture of phosphor materials can be appropriately selected from well known mixing methods. For example, the mixture of phosphor materials may be prepared by any one of the following methods (i) to (iv).

(i) the phosphor materials (1) to (5) are weighed out and simply mixed;

(ii) the phosphor materials (1) to (4) are weighted out and mixed. A resultant mixture is heated at a temperature of 100° C. or more for several hours. The phosphor material (5) is mixed with a resultant heat-treated product;

(iii) the phosphor materials (1) to (5) are mixed together and a resultant mixture is heated at a temperature of 100° C. or more for several hours; and (iv) the phosphor materials (1) to (4) are mixed as a suspension. The obtained suspension is dried by reduced pressure drying, vacuum drying, or spray drying while being heated preferably to 50 to 200° C. Then, the phosphor material (5) is mixed with an obtained dry product.

Further, the following processes (iv-2), (iv-3) and (iv-4) can be favorably included as examples of modifications of the above-described preparation process (iv):

(iv-2) the phosphor materials (1) to (5) are mixed as a suspension, and a resultant suspension is dried;

(iv-3) a suspension containing the phosphor materials (1) and (5) is dried by reduced pressure drying, vacuum drying or spray drying while or later being heated, preferably to 50 to 200° C. Then, the phosphor materials (2) to (4) are added to and mixed with the obtained mixture;

(iv-4) in a case in which a mixture is prepared by carrying out calcination two times or more, the phosphor materials (1) and (2) are mixed as a suspension and calcinated. The phosphor materials (3) and (4) are mixed with them after a first calcination. A resultant suspension is dried by reduced pressure drying, vacuum drying, or spray drying while being heated, preferably to 50 to 200° C. Then, the phosphor material (5) is mixed with an obtained dry product.

Further, a method for preparing a rare earth-activated, alkaline earth metal fluorohalide based stimulable phosphor having a tetradecahedral structure with controlled particle shape and particle aspect ratio is disclosed in JP-A Nos. 7-233369 and 10-195431. That is, in addition to the processes (i) to (iv-4) for preparing the mixture of phosphor materials, there can also be used a preparing process (v), in which a means for applying shearing force at the time of mixing phosphor materials is used, and a preparing process (vi), in which a means for controlling various conditions such as timings of adding of each phosphor material and mixing them, and the like is used.

A mixing device used for mixing in the preparing processes (v) and (vi) can be appropriately selected for use from well known mixing devices. Examples of mixing devices include various mixers, a V-type blender, a ball mill, a rod mill, and the like.

When manufacturing an iodine-containing barium fluorohalide phosphor, in order to further improve stimulated emission amount, erasability and the like, various additive components as described below can be added.

Examples of such additive components include B, disclosed in JP-A No. 57-23673; As, disclosed in JP-A No. 57-23675; a tetrafluoroborate compound, disclosed in JP-A No. 59-27980; a hexafluoro compound, disclosed in JP-A No. 59-47289; transition metals such as V, Cr, Mn, Fe, Co and Ni, disclosed in JP-A No. 59-56480; and $BeX''_2$ (wherein X" is at least one halogen atom selected from the group consisting of F, Cl, Br and I), disclosed in JP-A No. 59-75200.

If these additive components are added, the additive components are added and mixed either at the time of weighting out and mixing the phosphor materials or prior to calcination of the phosphor materials.

Calcinating Step

The mixture of phosphor materials is packed into a heat resistant container such as a quartz boat, an alumina crucible, a quartz crucible, a furnace tube or the like, which is placed in an electric furnace and calcinated.

The calcinating temperature is preferably 600 to 1000° C., and more preferably 700 to 850° C. If the calcinating temperature is lower than 600° C., diffusion of an activator element in a host crystal and generation of $F^+$ which serves as a central source of stimulation may be insufficient. If the calcinating temperature is higher than 1000° C., the host crystal may melt.

A calcinating time varies depending on a packed amount of the mixture of phosphor materials, calcinating temperature, temperature at which the mixture is taken out from the furnace and the like, but is generally preferably from 0.5 to 6 hours, and more preferably from 1 to 3 hours.

If the calcinating time is less than 0.5 hours, diffusion of an activator element in the host crystal and generation of F+ which serves as a central source of stimulation may be insufficient. If the calcinating is carried out for more than 6 hours, there is little further change in the characteristics of the phosphor, but productivity may be reduced.

An atmosphere in the furnace tube in the calcinating step is preferably a neutral gas atmosphere or a slightly oxidizing gas atmosphere.

Examples of neutral atmosphere gases include inert gases such as He, Ne, Ar, $N_2$, and the like.

The slightly oxidizing gas atmosphere means a weakly oxidizing gas atmosphere containing 100 to 100,000 ppm and preferably 150 to 50,000 ppm of oxygen per unit volume of neutral gas. An example of the slightly oxidizing gas atmosphere is a weakly oxidizing gas atmosphere containing oxygen at the above-described concentration in an inert gas such as He, Ne, Ar, $N_2$ or the like.

An amount of oxygen introduced is preferably 0.1 to 200 ml, and more preferably 1 to 100 ml at the calcinating temperature per 1 l of the volume of a calcinating region of the furnace. If the amount of oxygen introduced is less than 0.1 ml/l effects of improvement in the erasability of the stimulable phosphor may not be sufficient. If the amount of oxygen introduced exceeds 200 ml/l the stimulated emission amount may remarkably deteriorate.

Methods of introducing oxygen into the neutral gas are not especially limited and can be appropriately selected from well known introducing methods. However, preferable among well known methods is a method in which, after the interior of the furnace tube is brought to a near vacuum state by evacuation, a predetermined amount of oxygen is introduced into the furnace tube and calcination is carried out within the furnace in a weakly oxidizing atmosphere. Hence, the required amount of oxygen can be accurately introduced into the furnace and, at the same time, influences of other gases can be minimized.

That is, by regulating the volume of the clacinating region and the amount of oxygen introduced for each 1 l of the volume of the calcinating region for each 1 kg of the mixture of phosphor materials, an amount of oxygen required to improve the erasability of the stimulabe phosphor can be introduced in the process of calcinating the mixture of phosphor materials.

Further, by replacing gas in the furnace tube with gas containing the predetermined amount of oxygen, oxygen can be introduced such that the amount of oxygen within the furnace tube increases in a stepwise manner or continuously.

A desired amount of oxygen is introduced by, for example, the following procedure.

First, immediately after the mixture of phosphor materials has been put into a calcinating furnace whose temperature has reached the calcinating temperature, evacuation is carried out for several minutes to exhaust air from the furnace tube. At this time, although calcination can be carried out as long as the interior of the furnace tube is near a vacuum, the degree of vacuum is preferably 0.1 torr or less in view of accurately specifying an amount of oxygen present in the atmosphere.

Next, a predetermined amount of oxygen is supplied to the interior of the furnace tube and a desired atmospheric pressure is provided. The amount of oxygen introduced at this time is, as described above, preferably 0.1 to 200 ml per 1 l of the volume of the calcinating region of the furnace tube. The volume of the amount of oxygen introduced is measured at the calcinating temperature.

After the predetermined amount of oxygen has been accurately introduced into the furnace tube, the neutral gas is also introduced into the furnace tube and the pressure within the furnace is adjusted to be about 760 torr (latm); that is, close to atmospheric pressure. Thereby, a weakly oxidizing atmosphere can be provided in the furnace.

To adjust the atmosphere within the furnace tube to be a weakly oxidizing atmosphere, for example, an oxygen-containing gas such as air or the like, or an oxygen-containing inert gas may be introduced in place of oxygen.

An introduced amount of oxygen-containing gas such as air is preferably required to be an amount of gas that has the same amount of oxygen as in the case in which oxygen is introduced. In a case in which air is introduced, the amount of air is more preferably 0.5 to 1000 ml per 1 l volume of the calcinating region of the furnace tube, and most preferably 5 to 500 ml. This introduced amount of air is a volume thereof at the calcinating temperature.

The introduction of oxygen into the furnace tube need not be carried out after evacuation to a vacuum state. An extremely small amount of oxygen may simply be introduced into a neutral gas atmosphere or a weakly oxidizing atmosphere in the furnace tube. Alternatively, a gas which contains oxygen, such as air, may be introduced into the furnace, so as to increase the amount of oxygen within the furnace tube.

A powdered stimulable phosphor can be obtained by the above-described calcinating step.

An annealing step is preferably provided prior to a cooling step, which will be described later, and subsequent to the calcinating step in which the mixture of phosphor materials was calcinated at a constant temperature as described above.

Annealing may be carried out immediately after the mixture of phosphor materials has been calcinated. It is preferable, however, that the annealing is carried out after a fixed period of time, during which the constant temperature is maintained and removal and replacement of the atmosphere are carried out.

In the annealing step, the temperature is controlled so as to slowly decrease from a temperature at which the annealing is started to a predetermined temperature. In view of improving light emission characteristics of the stimulable phosphor, it is preferable to carry out the annealing at a rate of temperature decrease of 0.2 to 5° C./min until the temperature reaches a temperature 20 to 200° C. lower than the temperature at the end of calcinating.

Cooling Step

Cooling in the cooling step may be carried out by either of a method in which the calcinated mixture of phosphor materials is left to stand so that the temperature thereof decreases and a method in which the temperature is controlled by a cooler and forcibly decreased. However, in view of reducing cooling time and reliably manufacturing a stimulable phosphor having satisfactory characteristics, the method of controlling cooling to a desired temperature is preferable. An atmosphere in the cooling step is preferably a neutral gas atmosphere, a weakly oxidizing gas atmosphere, or a vacuum.

Other Steps

Further, various general steps such as a proceeding and drying step which conducts a washing and drying, a sieving step and the like can be provided, as necessary, to the calcinated stimulable phosphor.

A powdered iodine-containing barium fluorohalide phosphor is obtained by the calcination. If necessary, various general processes such as washing, drying, sieving, and the like can be carried out on the obtained powdered phosphor.

C: Radiation Image Conversion Panel

The iodine-containing barium fluorohalide phosphor obtained in the above-described manner can be used as a stimulable phosphor contained in a phosphor layer of a radiation image conversion panel. Below, a description will be given of such a radiation image conversion panel.

The radiation image conversion panel is basically formed by a support and a phosphor layer provided on the support. The phosphor layer is formed by the stimulable phosphor and a binder which contains and supports the stimulable phosphor in a dispersed state. The phosphor layer can be formed on the support by, for example, the following process.

Firstly, the iodine-containing barium fluorohalide phosphor powder and the binder are added to and thoroughly mixed with an appropriate solvent to prepare a coating solution in which phosphor particles are uniformly dispersed in the binder solution.

Examples of the binder used in the phosphor layer include natural polymer substances such as proteins such as gelatin and the like, polysaccharides such as dextran and the like, and a gum arabic;

and synthetic polymer substances such as polyvinylbutyral, polyvinyl acetate, nitrocellulose, ethyl cellulose, a copolymer of vinylidene chloride and vinyl chloride, polyalkyl(meth)acrylate, a copolymer of vinyl chloride and vinyl acetate, polyurethane, cellulose acetate butylate, polyvinyl alcohols, linear polyesters, and the like; and the like. Of the above, especially preferable examples of the binder include nitrocellulose, linear polyesters, polyalkyl (meth) acrylate, polyurethane, a mixture of nitrocellulose and a linear polyester, and a mixture of nitrocellulose and polyalkyl(meth)acrylate. These binders may be cross-linked by a cross-linking agent.

Examples of the solvent for preparing the coating solution include lower alcohols such as methanol, ethanol, n-propanol, n-butanol and the like; chlorine-containing hydrocarbons such as methylene chloride, ethylene chloride and the like; ketones such as acetone, methyl ethyl ketone, methyl isobutyl ketone and the like; esters of lower fatty acids and lower alcohols such as methyl acetate, ethyl acetate, butyl acetate and the like; ethers such as dioxane, ethylene glycol monoethylether, ethylene glycol monomethylether and the like; and mixtures thereof.

A mixing ratio of the binder and the phosphor in the coating solution varies depending on characteristics of a desired radiation image conversion panel, the type of phosphor and the like. The mixing ratio is generally selected from the range of 1:1 to 1:100 (weight ratio), and particularly preferably from the range of 1:8 to 1:40 (weight ratio).

Various additives such as a dispersing agent for enhancing dispersibility of phosphor particles in the coating solution, a plasticizer for enhancing bonding strength between the binder and the phosphor particles in the formed phosphor layer, and the like may be mixed with the coating solution. Examples of the dispersing agent used for such a purpose include phthalic acid, stearic acid, caproic acid, lipophilic surfactants and the like. Examples of the plasticizer include phosphoric esters such as triphenyl phosphate, tricresyl phosphate, diphenyl phosphate and the like; ester phthalates such as diethyl phthalate, dimethoxyethyl phthalate and the like; ester glycolates such as ethyl phthalyl ethyl glycolate, butyl phthalyl butyl glycolate and the like; polyesters of polyethylene glycols and aliphatic dibasic acids, such as a polyester of triethylene glycol and adipic acid, a polyester of diethylene glycol and succinic acid and the like; and the like.

Next, the coating solution, which has been prepared in the above-described manner and which contains the phosphor powder and the binder, is uniformly applied to a surface of the support so as to form a film of the coating solution. This coating can be carried out using a usual coating means, such as a doctor blade, a roll coater, a knife coater, or the like.

After the film is formed, it is dried. Thus, the phosphor layer is formed on the support. The thickness of the phosphor layer varies depending on the characteristics of the desired radiation image conversion panel, the type of phosphor, the mixing ratio of the binder and the phosphor, and the like. The thickness is usually 20 $\mu$m to 1 mm and preferably 50 to 500 $\mu$m.

The phosphor layer is not necessarily formed by directly applying the coating solution onto the support as described above. For example, the coating solution may be separately applied onto a sheet (temporary support) such as a glass plate, a metallic plate, a plastic sheet or the like, dried so as to form the phosphor layer, peeled off, and then pressed onto the support. Alternatively, the phosphor layer may be adhered to the support with an adhesive.

The phosphor layer may be formed by a single layer or by two or more layers. If two or more layers are laminated, at least one layer is a layer which contains an iodine-containing barium fluorohalide phosphor. In either of a case in which the phosphor layer is formed by a single layer and a case in which the phosphor layer is formed by two or more layers, other types of stimulable phosphors may be used together with the iodine-containing barium fluorohalide phosphor.

The support can be freely selected from various materials which can be used as an intensifying screen support in conventional radiography and various materials which are well known as a support of a radiation image conversion panel. Examples of such materials include films of plastic materials such as cellulose acetate, polyester, polyethylene terephthalate, polyamide, polyimide, triacetate, polycarbonate and the like; metallic sheets such as aluminum foil, aluminum alloy foil and the like; ordinary paper; baryta paper; resin-coated paper; pigment paper containing a pigment such as titanium dioxide or the like; paper sized with polyvinyl alcohol or the like; and the like. When considering characteristics of the radiation image conversion panel as an information recording material, handling of the radiation image conversion panel, and the like, an especially preferable material for the support is plastic film. A light absorbing material such as carbon black or the like, or a light reflecting material such as titanium dioxide or the like may be mixed in the plastic film. A plastic film with which a light absorbing material is mixed is a support suitable for a high-sharpness type radiation image conversion panel, and a plastic film with which a light reflecting material is mixed is a support suitable for a high-sensitivity type radiation image conversion panel.

In a well known radiation image conversion panel, in order to strengthen bonding between a support and a phosphor layer, or to enhance sensitivity or image quality (sharpness and resolution) of the radiation image conversion panel, a polymer material such as gelatin or the like may be applied to a surface of the support at a side thereof at which the phosphor layer is formed, so as to form an adhesive layer which provides adhesiveness. Further, a light reflecting layer formed by a light reflecting material such as titanium dioxide or the like or a light absorbing layer formed by a light absorbing material such as carbon black or the like may be provided. Such layers may also be provided in the radiation image conversion panel of the present invention.

As disclosed in JP-A No. 58-200200, in order to enhance sharpness of an obtained image, very small irregularities may be uniformly formed on the surface of the support at the phosphor layer side thereof (which is a surface of an adhesiveness providing layer, a light reflecting layer, a light absorbing layer or the like if one or more of these layers is provided on the surface of the support at the phosphor layer side).

In an ordinary radiation image conversion panel, in order to physically and chemically protect the phosphor layer, a transparent protective layer is provided on a surface of the phosphor layer opposite the side thereof at which the support is provided.

The transparent protective layer can be formed by dissolving a transparent polymer material in a suitable solvent to prepare a solution, and then applying the resultant solution to the surface of the phosphor layer. The transparent polymer material may be a cellulose derivative such as cellulose acetate, nitrocellulose or the like, or a synthetic polymer material such as polymethyl methacrylate, polyvinyl butyral, polyvinyl formal, polycarbonate, polyvinyl acetate, a copolymer of vinyl chloride and vinyl acetate or the like. Alternatively, the protective layer can be formed by adhering a separately formed transparent thin film of polyethylene terephthalate, polyethylene, polyvinylidene chloride, polyamide or the like to the surface of the phosphor layer with a suitable adhesive. The thickness of the transparent protective film formed in the above-described manner is desirably about 3 to 20 μm.

As disclosed in JP-A Nos. 55-163500, 57-96300 and the like, a radiation image conversion panel may be colored by a coloring agent. It is possible to enhance sharpness of an obtained image by the coloring. As disclosed in JP-A No. 55-146447, a white powder may be dispersed in the phosphor layer for the same purpose as coloring with a coloring agent.

EXAMPLES

The present invention will be more specifically described by examples below. The present invention is not limited to these examples.

Example 1

2 mol of barium carbonate ($BaCO_3$) was added to and mixed with 500 ml of hydroiodic acid (containing 3 mol of HI) to obtain a slurry solution. The resultant solution was concentrated to obtain a suspension in which the concentration of barium iodide ($BaI_2$) was 5 mol/l (suspension preparing step).

Next, 0.0005 mol of europium iodide was added to and mixed with the suspension. 1 mol of hydrogen fluoride was added to the suspension at a rate of 0.1 mol/min (precipitate generating step). Then, the resultant suspension was reacted for 3 hours while being stirred at 60° C.(ripening step).

After the reaction, a precipitate was filtrated by suction using filter paper. Then, the precipitate was washed with 2-propanol and vacuum-dried for 8 hours at 100° C., so as to obtain europium-activated barium fluoroiodide. The yield of the barium fluoroiodide was 70%. The average particle diameter of the barium fluoroiodide was 4.0 μm.

A filtrate was re-used as a reaction mother liquor.

Example 2

Europium-activated barium fluoroiodide was obtained in the same manner as in Example 1 except that in Example 2, after the ripening step, 150 ml of 2-propanol was added to a reaction solution so as to accelerate coprecipitation of barium fluoroiodide (BaFI) and europium iodide (precipitation accelerating step). The yield of barium fluoroiodide was 70% and the average particle diameter thereof was 4.0 μm.

Comparative Example 1

Europium-activated barium fluoroiodide was obtained by the same manner as that of Example 2 except that in Comparative Example 1, when a solution was concentrated in the suspension preparing step (described in Example 1), the concentration of barium iodide in the solution was 2 mol/l. The yield of barium fluoroiodide was 63% and the average particle diameter thereof was 7.0 μm.

Component Analysis of Barium Fluoroiodide

Iodine content, product purity and concentration of fluorine ions in the mother liquor after the reaction were analyzed for the respective barium fluoroiodides obtained in Examples 1 and 2 and Comparative Example 1. An analyzing process is as follows.

A generally known titration method was used for analyzing the iodine content and the concentration of fluorine ions. The purity analysis was effected by carrying out an X-ray diffraction measurement on the products.

Figure 2:
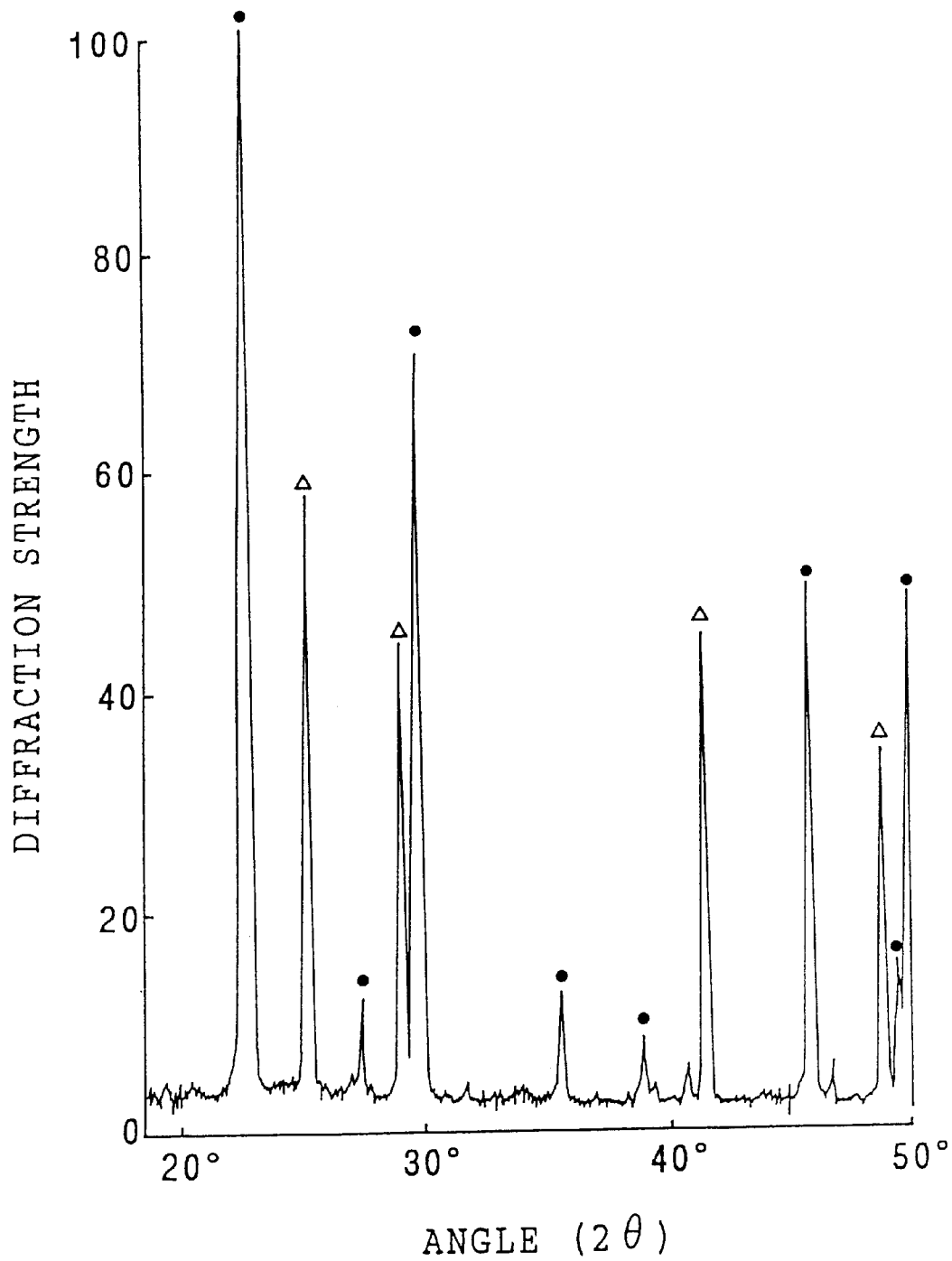
FIG. 2 is a graph showing an X-ray diffraction spectrum of a product obtained in Comparative Example 1.

Results of component analysis of respective components is shown in Table 1 below, and X-ray diffraction spectra are shown in FIGS. 1 and 2. FIG. 1 shows the X-ray diffraction spectra for Examples 1 and 2, and FIG. 2 shows the X-ray diffraction spectrum for Comparative Example 1. A black dot (·) denotes a peak of BaFI and a triangle (Δ) denotes a peak of $BaF_2$.

TABLE 1

|  | Yield (%) | Content of I (%) | Concentration of Fluorine Ions in Reaction Mother Liquor (ppm) |
| --- | --- | --- | --- |
| Example 1 | 70 | 44.6 | 1100 |
| Example 2 | 70 | 44.8 | 50 |
| Comparative Example 1 | 63 | 42.1 | 3000 |

As can be seen from Table 1 and FIGS. 1 and 2, the iodine contents in Examples 1 and 2 are higher than in Comparative Example 1. Further, no $BaF_2$ which is an impurity, is mixed in in Examples 1 and 2 and production efficiency is higher. The concentrations of fluorine ions in the reaction mother liquors in Examples 1 and 2 are less than in Comparative Example 1. Especially, the concentration of fluorine ions in the reaction mother liquor is remarkably reduced in Example 2, in which the precipitation accelerating step was provided.

As described above, in accordance with the method of preparing barium fluoroiodide of the present invention, it was possible to obtain barium fluoroiodide at high purity and high yield. Further, an iodine-containing barium fluorohalide phosphor in which at least one material was barium fluoroiodide having high purity which is prepared by the method of preparing barium fluoroiodide of the present invention, and a radiation image conversion panel using the iodine-containing barium fluorohalide phosphor had superior characteristics.

What is claimed is:

1. A method of preparing barium fluoroiodide comprising the steps of:
   (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l;
   (b) precipitating barium fluoroiodide by adding a total amount of hydrogen fluoride to the suspension to achieve a molar ratio from 0.4 to 0.8 of hydrogen. hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and
   (c) separating the precipitate.

2. The method of preparing barium fluoroiodide according to claim 1, wherein the step of mixing barium carbonate, includes adding one of europium halide and cerium halide such that a molar ratio thereof to a finally obtained amount of barium fluoroiodide will be from 0.00001 to 0.01.

3. The method of preparing barium fluoroiodide according to claim 1, wherein reaction temperature in the step of precipitating barium fluoroiodide is from 20 to 80° C.

4. The method of preparing barium fluoroiodide according to claim 1, after the step of precipitating barium fluoroiodide, further comprising the step of ripening at 20 to 80° C. for 10 minutes to 36 hours.

5. The method of preparing barium fluoroiodide according to claim 1, further comprising, after the step of precipitating barium fluoroiodide, a step of accelerating precipitation in which a solvent is added and the barium fluoroiodide is thereby precipitated, a solubility of the barium fluoroiodide in the solvent being lower than a solubility of the barium fluoroiodide in water.

6. The method of preparing barium fluoroiodide according to claim 4, further comprising, after the step of ripening, a step of accelerating precipitation in which a solvent is added and the barium fluoroiodide is thereby precipitated, a solubility of the barium fluoroiodide in the solvent being lower than a solubility of the barium fluoroiodide in water.

7. The method of preparing barium fluoroiodide according to claim 5, wherein the solvent comprises 2-propanol.

8. The method of preparing barium fluoroiodide according to claim 1, wherein the average particle diameter of barium fluoroiodide obtained, is 1 to 20 $\mu$m.

9. The method of preparing barium fluoroiodide according to claim 1, wherein the step of separating results in a remaining solution, further comprising the step of concentrating the remaining solution for reuse in preparing additional barium fluoroiodide.

10. A method of preparing an iodine-containing barium fluorohalide phosphor comprising the steps of:
    (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l, and activating barium fluoroiodide by mixing with europium or cerium such that a molar ratio thereof to a finally obtained amount of barium fluoroiodide is in the range of about 0.00001 to about 0.01;
    (b) precipitating barium fluoroiodide by adding a total amount of hydrogen fluoride to the suspension to achieve a molar ratio from 0.4 to 0.8 of hydrogen iodide to the barium carbonate, and wherein the hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and
    (c) separating the precipitate, wherein the barium fluoroiodide has an average particle diameter of 1 to 20 $\mu$m.

11. The method of preparing an iodine-containing barium fluorohalide phosphor according to claim 10, wherein the step of mixing barium carbonate, includes adding one of europium halide and cerium halide such that a molar ratio thereof to a finally obtained amount of barium fluoroiodide will be from 0.00001 to 0.01.

12. The method of preparing an iodine-containing barium fluorohalide phosphor according to claim 10, wherein reaction temperature in the step of precipitating barium fluoroiodide is from 20 to 80° C.

13. The method of preparing an iodine-containing barium fluorohalide phosphor according to claim 10, after the step of precipitating barium fluoroiodide, further comprising the step of ripening at 20 to 80° C. for 10 minutes to 36 hours.

14. The method of preparing an iodine-containing barium fluorohalide phosphor according to claim 10, further comprising, after the step of precipitating barium fluoroiodide, a step of accelerating precipitation in which a solvent is added and the barium fluoroiodide is thereby precipitated, a solubility of the barium fluoroiodide in the solvent being lower than a solubility of the barium fluoroiodide in water.

15. The method of preparing an iodine-containing barium fluorohalide phosphor according to claim 13, further comprising, after the step of ripening, a step of accelerating precipitation in which a solvent is added and the barium fluoroiodide is thereby precipitated, a solubility of the barium fluoroiodide in the solvent being lower than a solubility of the barium fluoroiodide in water.

16. A method of preparing a radiation image conversion panel comprising the steps of:
    (i) preparing barium fluoroiodide by:
       (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l;
       (b) precipitating barium fluoroiodide by adding a total amount of hydrogen fluoride to the suspension to achieve a molar ratio from 0.4 to 0.8 of hydrogen iodide to the barium carbonate, and wherein the hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and
       (c) separating the precipitate, and
    (ii) coating the barium fluoroiodide prepared in step (i) onto a support.

17. The method of preparing a radiation image conversion panel according to claim 16, wherein the step of mixing barium carbonate, includes adding one of europium halide and cerium halide such that a molar ratio thereof to a finally obtained amount of barium fluoroiodide will be from 0.00001 to 0.01.

18. The method of preparing a radiation image conversion panel according to claim 16, wherein reaction temperature in the step of precipitating barium fluoroiodide is from 20 to 80° C.

19. The method of preparing a radiation image conversion panel according to claim 16, after the step of precipitating barium fluoroiodide, further comprising the step of ripening at 20 to 80° C. for 10 minutes to 36 hours.

20. The method of preparing a radiation image conversion panel according to claim 16, further comprising, after the step of precipitating barium fluoroiodide, a step of accelerating precipitation in which a solvent is added and the barium fluoroiodide is thereby precipitated, a solubility of the barium fluoroiodide in the solvent being lower than a solubility of the barium fluoroiodide in water.

21. A method of preparing an iodine-containing barium fluorohalide phosphor comprising mixing:
   (i) a first barium fluorohalide obtained by:
      (a) mixing barium carbonate with an aqueous solution of hydrogen iodide in a molar ratio from 0.5 to 2 of hydrogen iodide to barium carbonate, and concentrating the resultant solution to prepare a suspension having barium iodide dissolved in the solution at a concentration of at least 3.0 mol/l;
      (b) precipitating barium fluoroiodide by adding a total amount of hydrogen fluoride to the suspension to achieve a molar ratio from 0.4 to 0.8 of hydrogen iodide to the barium carbonate, and wherein the hydrogen fluoride is added at a rate to generate 0.001 N/minute to 10 N/minute of barium fluoroiodide precipitate, wherein N is the theoretical amount of barium fluoroiodide precipitate that can be generated based upon the amount of barium carbonate in the suspension; and
      (c) separating the precipitate, with
   (ii) a second phosphor material.

22. The method of preparing an iodine-containing barium fluorohalide phosphor of claim 21, wherein the second phosphor material is selected from the group consisting of:
   (1) at least one barium halide selected from the group consisting of $BaF_2$, $BaCl_2$, $BaBr_2$, BaFBr and BaFCl;
   (2) at least one alkaline earth metal halide selected from the group consisting of $CaF_2$, $CaCl_2$, $CaBr_2$, $CaI_2$, $SrF_2$, $SrC_2$, $SrBr_2$, $SrI_2$, $MgF_2$, $MgCl_2$, $MgBr_2$ and $MgI_2$;
   (3) at least one alkaline metal halide selected from the group consisting of XsXl, XsBr, XsI, NaCl, NaBr, NaI, KCl, KBr, KI, RbCl RbBr, RbI, RbF, CsF, KF, LiF, LiCl, LiBr and LiI;
   (4) at least one metal oxide selected from the group consisting of $Ala_2O_3$, and $ZrO_2$; and
   (5) at least one compound selected from the group consisting of halides, oxides, nitrates, sulfates, Ce, Pr, Sm, Eu, Gd, Tb, Dy, Pm, Ho, Nd, Er, Tm and Yb.

* * * * *